United States Patent
Parkes et al.

(10) Patent No.: US 9,329,293 B2
(45) Date of Patent: May 3, 2016

(54) SYSTEMS AND METHODS FOR REMOVING ACQUISITION RELATED EFFECTS FROM SEISMIC DATA

(71) Applicant: PGS Geophysical AS, Lysaker (NO)

(72) Inventors: Gregg Parkes, Wiltshire (GB); Stian Hegna, Hovik (NO)

(73) Assignee: PGS GEOPHYSICAL, AS, Oslo (NO)

( * ) Notice: Subject to any disclaimer, the term of this patent is extended or adjusted under 35 U.S.C. 154(b) by 516 days.

(21) Appl. No.: 13/795,661

(22) Filed: Mar. 12, 2013

(65) Prior Publication Data
US 2014/0269182 A1    Sep. 18, 2014

(51) Int. Cl.
*G01V 1/38* (2006.01)

(52) U.S. Cl.
CPC .................. *G01V 1/3861* (2013.01)

(58) Field of Classification Search
CPC ................. G01V 1/38; G01V 1/3861
USPC ....................................... 367/15, 24
See application file for complete search history.

(56) References Cited

U.S. PATENT DOCUMENTS

| | | | |
|---|---|---|---|
| 5,818,795 A | 10/1998 | Hawkins et al. |
| 6,751,559 B2 | 6/2004 | Fookes et al. |
| 6,906,981 B2 | 6/2005 | Vaage |
| 7,450,467 B2 | 11/2008 | Tveide et al. |
| 7,869,303 B2 | 1/2011 | Kinkead |

FOREIGN PATENT DOCUMENTS

| | | |
|---|---|---|
| WO | 2009131619 A2 | 10/2009 |
| WO | 2012078978 A1 | 6/2012 |
| WO | 2012097122 A1 | 7/2012 |

OTHER PUBLICATIONS

"Interval (mathematics)," Mar. 2, 2012, Wikipedia, downloaded Aug. 17, 2015 from https://en.wikipedia.org/w/index.php?title=Interval__(mathematics)&oldid=479770665, 5 pp.*
Press, et al., Numerical Recipes in C++, Cambridge University Press, 2002, pp. 279-280.*
United Kingdom Search Report mailed on Jul. 16, 2014, in patent application GB1404197.4, 3 pages.
Posthumus, B.J., "Deghosting using a twin streamer configuration", Geophysical Prospecting 41, 1993, pp. 267-286.
Carlson, David et al., "Increased resolution and penetration from a towed dual-sensor streamer", First Break, vol. 25, Dec. 2007, pp. 71-77.
Landro, Martin, "The effect of noise generated by previous shots on seismic reflection data", Geophysics, vol. 73, May-Jun. 2008, pp. Q9-Q17.

* cited by examiner

*Primary Examiner* — Daniel L Murphy

(57) ABSTRACT

Systems and methods for operating a seismic source to attenuate shot generated noise, or residual energy from previous activation of the source, in recorded seismic data are described. In one aspect, methods operate a single seismic source towed through a body of water along a survey track. As the survey vessel travels along the survey track, the source is activated at the end of randomly selected time delays, resulting in attenuation of shot generated noise. The method also attenuates other forms of coherent noise that align from shot to shot.

42 Claims, 13 Drawing Sheets

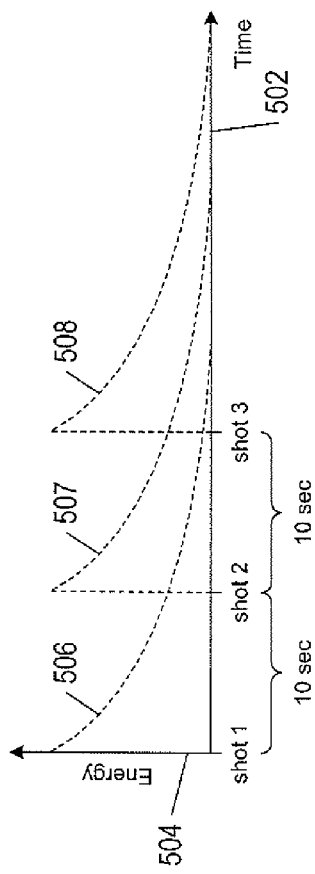
FIG. 5
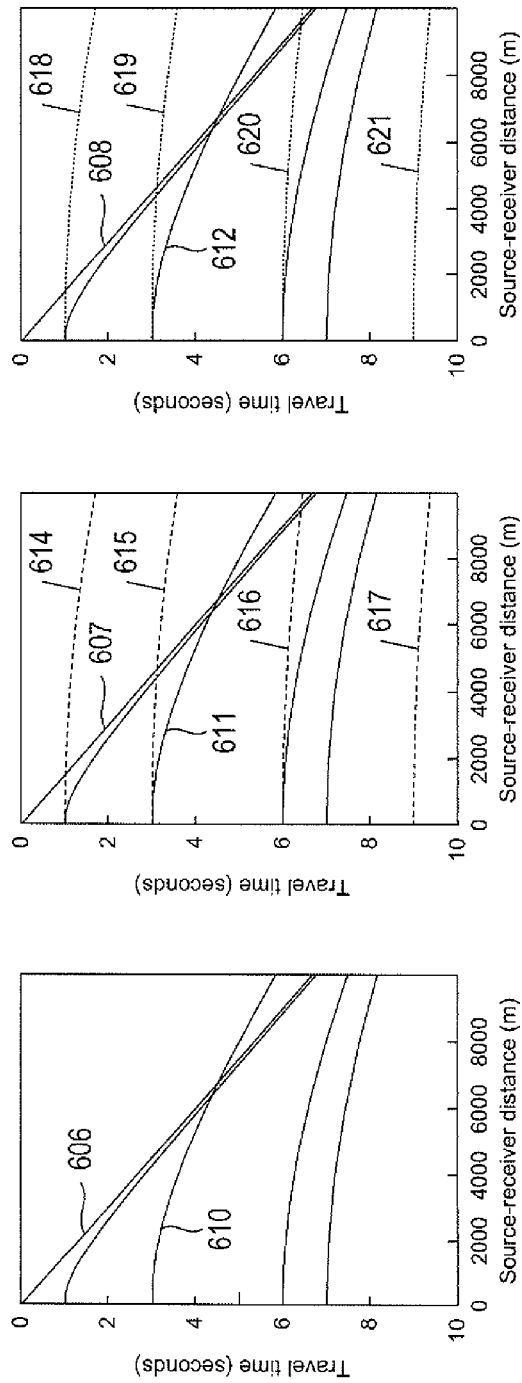
FIG. 6A
FIG. 6B
FIG. 6C

SYSTEMS AND METHODS FOR REMOVING ACQUISITION RELATED EFFECTS FROM SEISMIC DATA

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution seismic images of a subterranean formation are essential for quantitative seismic interpretation and reservoir monitoring. For a typical marine seismic survey, a survey vessel tows a source and the same or another survey vessel tows one or more streamers that form a seismic data acquisition surface below the surface of the water and over a subterranean formation to be surveyed for mineral deposits. The survey vessel contains seismic acquisition equipment, such as navigation control, source control, seismic receiver control, and recording equipment. The source control activates the source, which is typically an array of source elements, such as air guns, to produce acoustic impulses at selected times. Activation of the source is also described as being "fired" or "shot" to produce the acoustic impulse. Each acoustic impulse is a sound wave that travels down through the water and into the subterranean formation. At each interface between different types of rock, a portion of the sound wave is refracted and another portion is reflected back toward the body of water to propagate toward the surface. The streamers towed behind the survey vessel are elongated cable-like structures. Each streamer may include a number of seismic receivers or dual sensors that detect pressure and particle motion wavefields associated with the sound waves reflected back into the water from the subterranean formation.

In a typical seismic marine survey, the source is activated on position. When the survey vessel tows the source at a substantially constant rate of speed, the source is fired at substantially regular intervals of time and seismic data is recorded during waiting periods (i.e., typically 10 seconds) between shots. A small variation in waiting periods is typically in the range of 0.1-0.2 seconds. Although the shot time may vary within this range, the time at which the source is fired is recorded precisely. Thus primary seismic data can be aligned from shot to shot. However, acoustic energy associated with sound waves reflected from the subterranean formation does not stop emanating from the subterranean formation at the end of a waiting period between shots. The acoustic energy recorded in one waiting period lingers in one or more subsequent waiting periods and is referred to as "shot generated noise." This noise is actually acoustic energy generated by the source, which is then reflected or scattered from anywhere in the subsurface. Although this energy may be low in amplitude within a single shot, in the lower frequency parts of the spectrum it is coherent, so it does add constructively in the various summation and imaging processes used to analyze seismic data. Obtaining high signal to noise levels at low frequencies is particularly important in seismic imaging and this shot generated coherent energy effectively acts as a noise source that contaminates the seismic images. As a result, those working in the petroleum industry seek systems and methods to reduce the effects of shot generated noise.

DESCRIPTION OF THE DRAWINGS

FIG. 5 shows a plot of acoustic energy versus time for three separate shots separated by waiting periods.

FIGS. 6A-6C show examples of shot-receiver gathers associated with a source fired three times.

DETAILED DESCRIPTION

Computational systems and methods for operating a seismic source to reduce shot generated noise, or residual energy from previous activation of the source, in recorded seismic data are described. Systems and methods described herein can be used to operate a seismic source with any receiver configuration and any marine seismic data acquisition system including, for example, towed streamers and ocean bottom cables.

Marine Seismic Data Acquisition Systems

Figure 1A:
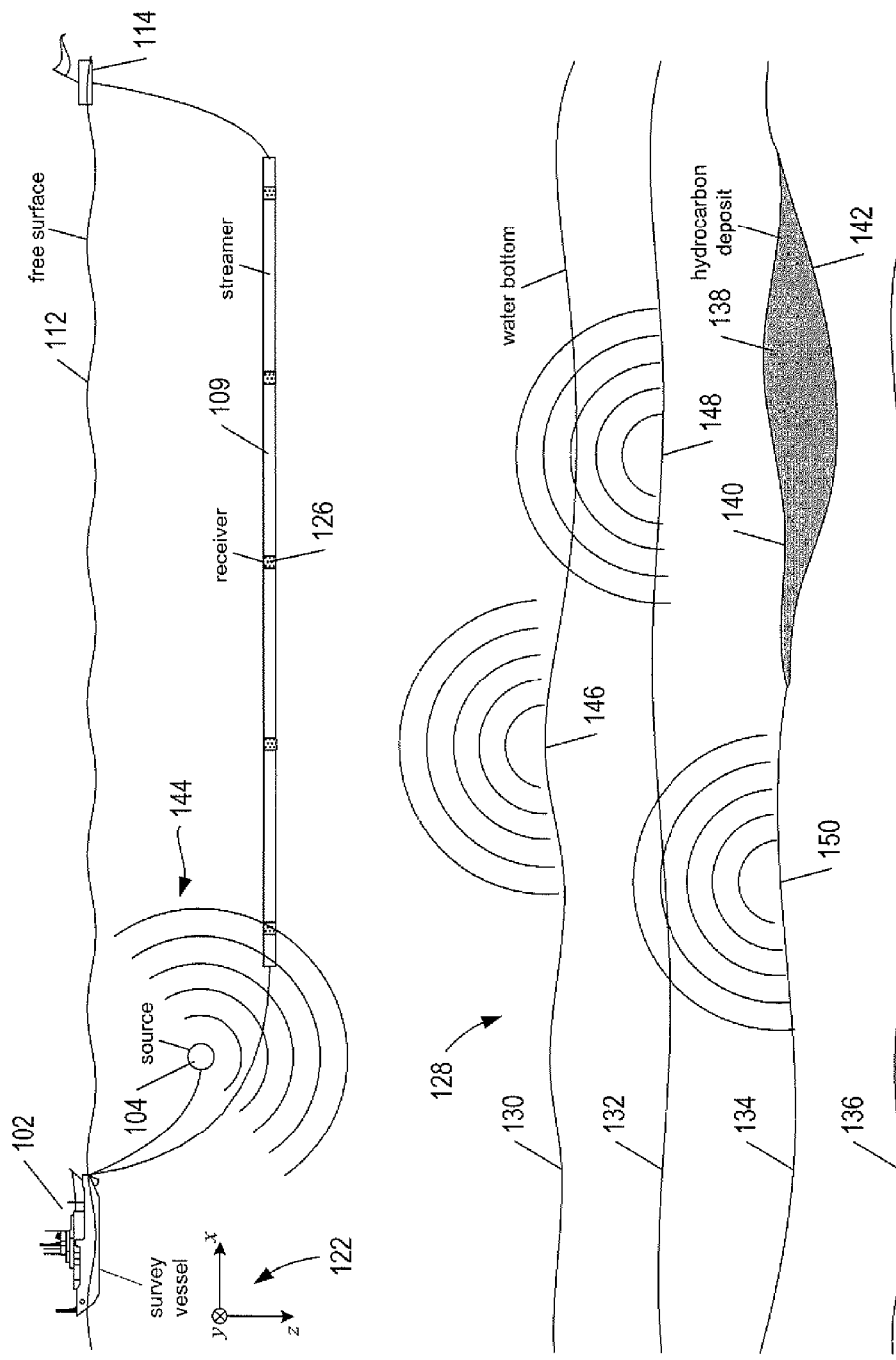
FIGS. 1A-1B show a side and top views of a marine seismic data acquisition system.
Figure 1B:
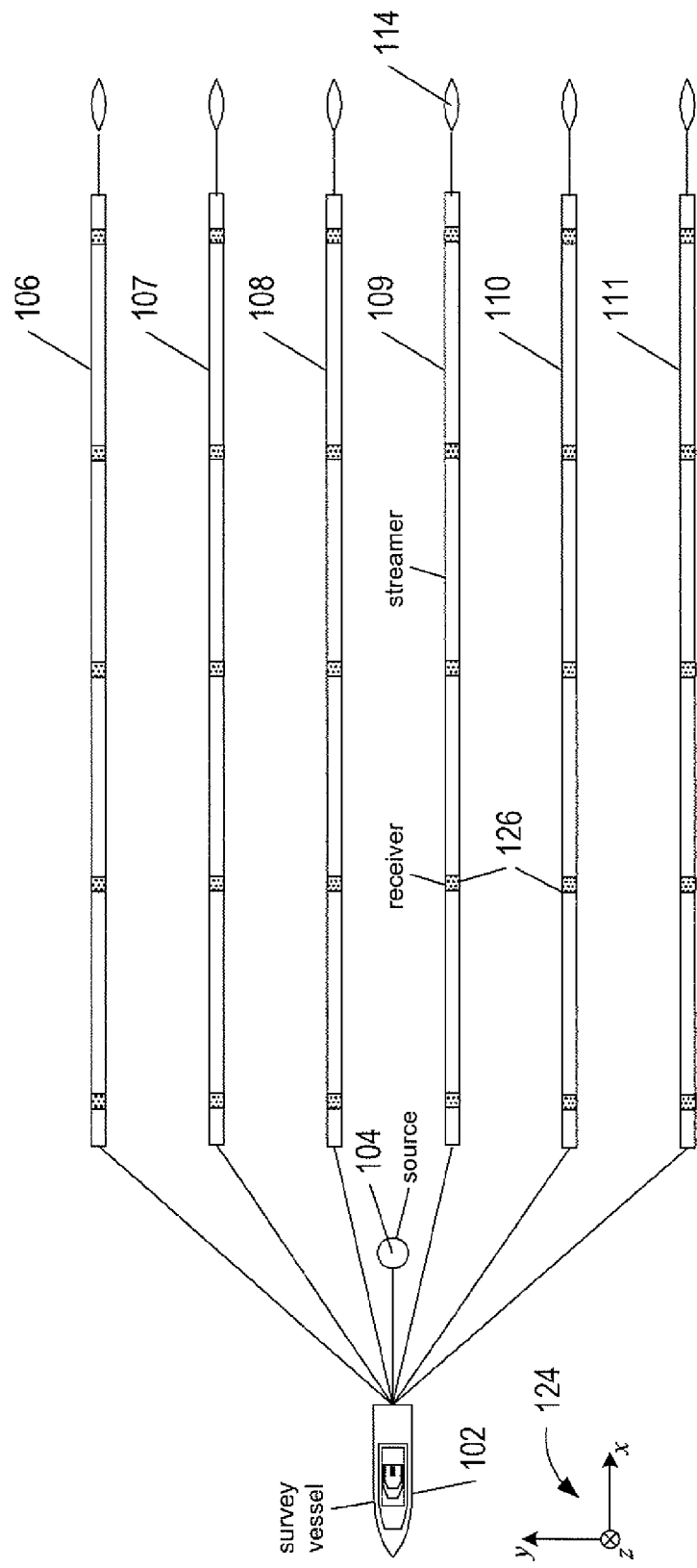

FIGS. 1A-1B show a side-elevation view and a top view, respectively, of a marine seismic data acquisition system composed of a survey vessel 102 towing a source 104 and six separate streamers 106-111 located beneath a free surface 112. Each streamer is attached at one end to the survey vessel 102 via a streamer data transmission cable and at the opposite end to a buoy, such as a buoy 114 attached to the steamer 109. In the example of FIGS. 1A-1B, the streamers 106-111 form a generally planar horizontal receiver acquisition surface located beneath the free surface 112. However, in practice, the receiver acquisition surface can be smoothly varying due to active sea currents and weather conditions. In other words, although the streamers 106-111 are illustrated in FIGS. 1A and 1B as being straight, in practice, the towed streamers may undulate as a result of dynamic conditions of the body of water in which the streamers are submerged. It should be noted that a receiver acquisition surface is not limited to having a horizontal orientation with respect to the free surface 112. The streamers may be towed at different depths. For example, the streamers may be towed at depths such that the receiver acquisition surface is towed at angle with respect to the free surface. It should also be noted that a receiver acquisition surface is not limited to six streamers. In practice, a receiver acquisition surfaces can be composed of as few as one streamer to as many as 20 or more streamers.

FIG. 1A includes an xz-plane 122 and FIG. 1B includes an xy-plane 124 of the same Cartesian coordinate system having three orthogonal, spatial coordinate axes labeled x, y and z.

The coordinate system is used to specify orientations and coordinate locations within a body of water. The x-direction specifies the position of a point in a direction parallel to the length of the streamers and is referred to as the "in-line" direction. The y-direction specifies the position of a point in a direction perpendicular to the x-axis and substantially parallel to the free surface 112 and is referred to as the "cross-line" direction. The z-direction specifies the position of a point perpendicular to the xy-plane (i.e., perpendicular to the free surface) with the positive z-direction pointing downward away from the free surface 112. Streamer depth below the free surface 112 can be estimated at various locations along the streamers using depth measuring devices attached to the streamers. For example, the depth measuring devices can measure hydrostatic pressure or utilize acoustic distance measurements. The depth measuring devices can be integrated with depth controllers, such as paravanes or water kites, that control the depth and position of the streamers as the streamers are towed through a body of water. The depth measuring devices are typically placed at about 300 meter intervals along each streamer. Note that in other embodiments the buoys can be omitted and depth controllers alone can be used to maintain the orientation and depth of the streamers below the free surface 112.

In FIGS. 1A-1B, shaded rectangles 126 represent receivers or sensors that are spaced-apart along the length of each streamer. The streamers 106-111 are long cables containing power and data-transmission lines that connect the receivers 126 to seismic acquisition equipment located on board the survey vessel 102. In one type of exploration seismology, each receiver is a dual sensor including a geophone that detects displacement within the body of water over time by detecting particle motion, velocities or accelerations, and a hydrophone that detects variations in water pressure over time. The streamers 106-111 and the survey vessel 102 include sensing electronics and data-processing facilities that allow receiver measurements to be correlated with absolute positions on the free surface 112 and absolute three-dimensional positions with respect to an arbitrary three-dimensional coordinate system.

FIG. 1A shows a cross-sectional view of the survey vessel 102 towing the source 104 and streamers above a subterranean formation 128. Curve 130 represents a solid surface at the bottom of a body of water located above the subterranean formation 128. The subterranean formation 128 is composed of a number of subterranean layers of sediment and rock. Curves 132, 134, and 136 represent interfaces between subterranean layers of different compositions. A shaded region 138, bounded at the top by a curve 140 and at the bottom by a curve 142, represents a hydrocarbon-rich subterranean deposit, the depth and positional coordinates of which may be determined by analysis of seismic data collected during a marine seismic survey. As the survey vessel 102 moves over the subterranean formation 128 the source 104 is activated to produce short duration pressure waves called acoustic impulses at spatial and temporal intervals. It should be noted that the terms "fire" and "shot" are also used to describe activation of the source 104 to generate an acoustic impulse. In other embodiments, the source may be towed by one survey vessel and the streamers towed by a second survey vessel. FIG. 1A illustrates an acoustic impulse expanding outward from the source 104 as a pressure wavefield represented by semicircles of increasing radius centered at the source 104. The wavefronts are, in effect, shown in vertical plane cross section in FIG. 1A. The outward and downward expanding portion of the pressure wavefield is called the "primary wavefield," which eventually reaches the surface 130 of the subterranean formation 128, at which point the primary wavefield is partially reflected from the surface 130 and partially refracted downward into the subterranean formation 128, becoming elastic waves within the subterranean formation 128. In other words, in the body of water, the acoustic impulse is composed of compressional pressure waves, or P-waves, while in the solid subterranean formation 128, the waves include both P-waves and transverse waves, or S-waves. Within the subterranean formation 128, at each interface between different types of materials or at discontinuities in density or in one or more of various other physical characteristics or parameters, downward propagating waves are partially reflected and partially refracted. As a result, each point of the surface 130 and each point of the interfaces within the underlying subterranean formation 128 becomes a potential secondary point source from which acoustic energy and elastic waves, respectively, may emanate upward toward the receivers 126 in response to the acoustic impulse generated by the source 104 and downward-propagating elastic waves generated from the pressure impulse. As shown in FIG. 1A, secondary waves of significant amplitude are generally emitted from points on or close to the surface 130, such as point 146, and from points on or very close to interfaces in the subterranean formation 128, such as points 148 and 150. Tertiary waves called "receiver ghosts" are produced by secondary waves that are reflected from the free surface 112 back towards the streamers 106-111 and the subterranean formation 128.

The secondary waves are generally emitted at different times within a range of times following the initial acoustic impulse. A point on the surface 130, such as the point 146, receives a pressure disturbance corresponding to the initial acoustic impulse more quickly than a point within the subterranean formation 128, such as points 148 and 150. Similarly, a point on the surface 130 directly beneath the source 104 receives the acoustic impulse sooner than a more distant-lying point on the surface 130. Thus, the times at which secondary and higher-order waves are emitted from various points within the subterranean formation 128 are related to the distance, in three-dimensional space, of the points from the source 104.

Acoustic and elastic waves, however, travel at different velocities within different materials as well as within the same material under different pressures. Therefore, the travel times of the primary wavefield and secondary wavefield emitted in response to the primary wavefield are complex functions of distance from the source 104 as well as the materials and physical characteristics of the materials through which the primary wave travels. In addition, the secondary expanding wavefronts may be altered as the wavefronts cross interfaces and as the velocity of sound varies in the media are traversed by the wave. The superposition of waves emitted from within the subterranean formation 128 in response to the primary wavefield is a generally very complicated wavefield that includes information about the shapes, sizes, and material characteristics of the subterranean formation 128, including information about the shapes, sizes, and locations of the various reflecting features within the subterranean formation 128 of interest to exploration seismologists.

Figure 2:
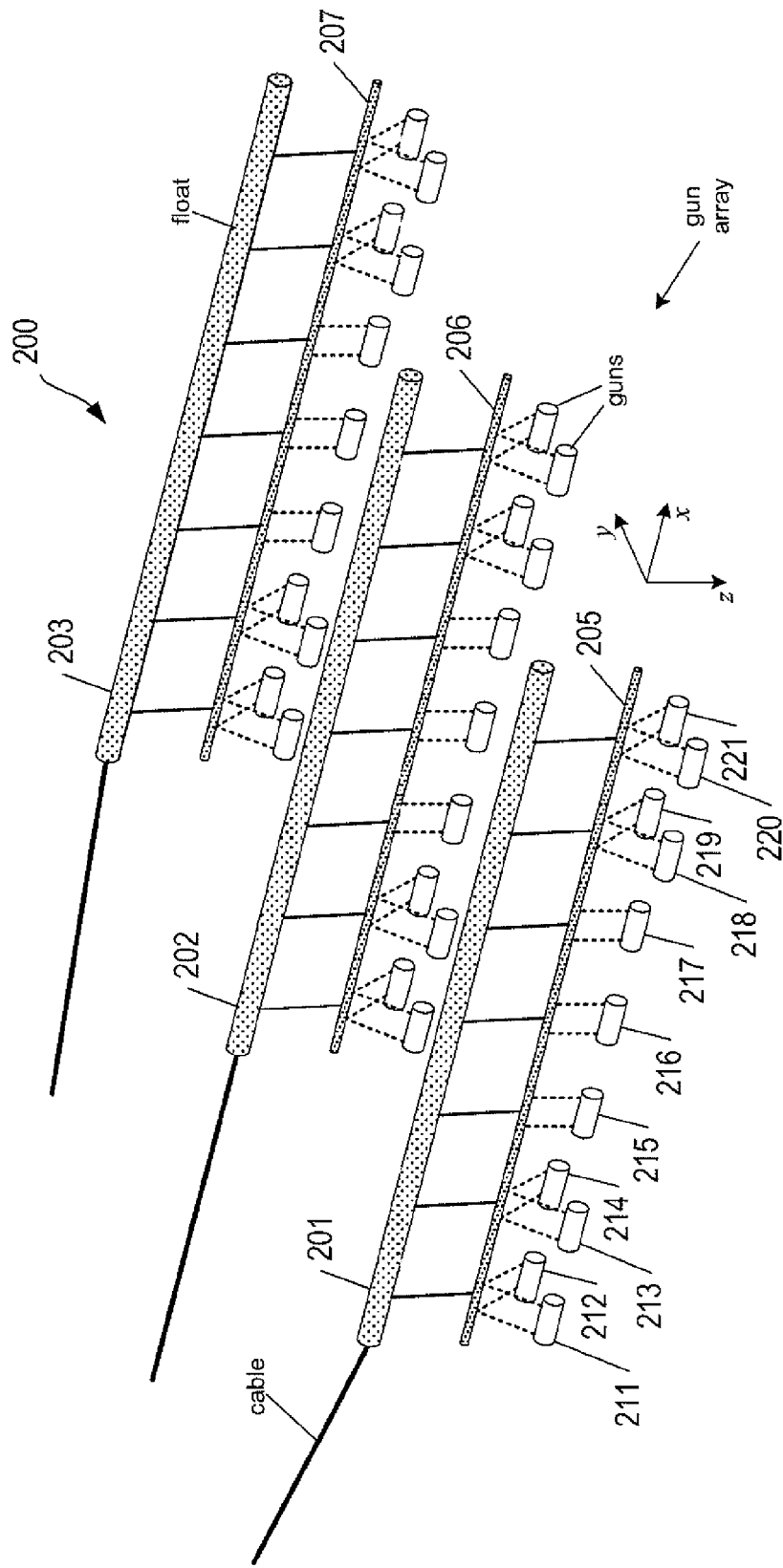
FIG. 2 shows an isometric view of an example source.

FIG. 2 shows an isometric view of an example source 200. The source 200 includes three separate floats 201-203 and three separate corresponding rods 205-207 suspended from the floats 201-203. Each rod is suspended from a corresponding float by a number of ropes or cables, such as cables 208. In the example of FIG. 2, eleven source elements are in turn suspended from each of the rods. For example, eleven source elements 211-221 are suspended from the rod 205. In other words, the source 200 is composed of a thirty-three source-element array 210. In practice, sources are not limited to an array with thirty-three source elements, but instead can be configured with one or more floats and each float can have any number of source elements suspended from the float.

Subterranean formations located beneath a body of water can also be investigated using ocean bottom seismic data acquisition systems. One example of an ocean bottom acquisition system is implemented with ocean bottom cables ("OBCs"). The OBCs are similar to the towed streamer cables described above in that the OBCs include a number of spaced-apart receivers, such as receivers deployed approximately every 25 to 50 m, but the OBCs are laid on or secured near the surface of the subterranean formation. The OBCs may be electronically connected to an anchored recording vessel that provides power, instrument command and control, and data telemetry of the sensor data to the recording equipment on board the recording vessel. Alternatively, ocean bottom seismic techniques can be implemented with autonomous systems composed of receiver nodes that are deployed and recovered using remote operated vehicles. The receiver nodes may be placed on the subterranean surface in a fairly coarse grid, such as approximately 400 meters apart. Autonomous receiver systems are typically implemented using one of two types of receiver node systems. A first receiver node system is a cable system in which the receiver nodes are connected by cables to each other and are connected to an anchored recording vessel. The cabled systems have power supplied to each receiver node along a cable and seismic data is returned to the recording vessel along the cable or using radio telemetry. A second receiver node system uses self-contained receiver nodes that have a limited power supply, but the receiver nodes typically have to be retrieved in order to download recorded seismic data. Whether using OBCs or autonomous receiver nodes, one or more survey vessels, each equipped with a seismic source as described above with reference to FIGS. 1A and 1B can be used to generate acoustic impulses at spatial and temporal intervals as the survey vessels move across the free surface.

Shot Generated Noise

Figure 3:
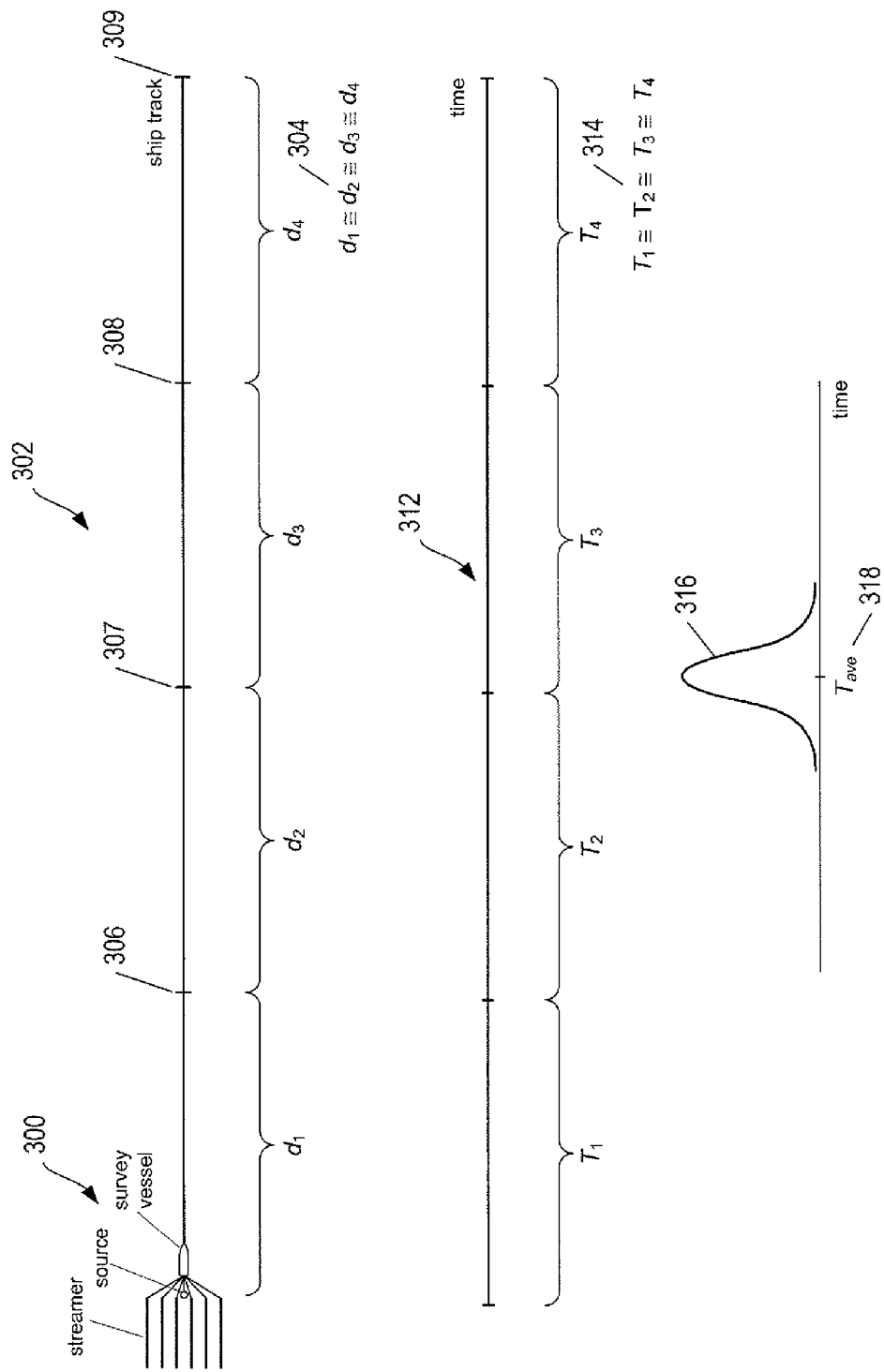
FIG. 3 shows a marine seismic data acquisition system traveling a survey vessel track.

FIG. 3 shows a marine seismic data acquisition system 300 composed of a survey vessel towing a source and six separate streamers. In this example, the survey vessel follows a straight survey vessel track 302, and the source is activated on position at substantially regularly spaced shot spacings 304 denoted by $d_1$, $d_2$, $d_3$, and $d_4$. In practice, the shot spacings can range from about 18 to about 50 meters. The source is composed of an array of source elements as described above. The vessel track 302 includes shot points 306-309 that identify the end of one shot spacing and the start of a subsequent shot spacing. The survey vessel includes global positioning instruments that enable the survey vessel to determine its current location and the location of the shot points. In practice, the survey vessel is not limited to traveling a straight-line vessel track. Vessel tracks can be curved or circular or be any other suitable non-linear path.

In conventional surveys, the source is typically activated when the seismic data acquisition system 300 reaches one of the shot points 306-309 and the time at which the source is activated is also recorded. For example, FIG. 3 includes a time line 312, the length of which represents the amount of time it takes the survey vessel to travel the vessel track 302. The time line 312 is divided into four waiting periods denoted by $T_1$, $T_2$, $T_3$, and $T_4$ that correspond to the four shot spacings $d_1$, $d_2$, $d_3$, and $d_4$. Each waiting period represents the amount of time it takes for the survey vessel to travel a corresponding shot spacing, and the waiting periods are approximately the same duration 314, corresponding to the regularly spaced shot spacings 304. For example, the waiting periods may be approximately 10 seconds between subsequent shots. After the source is activated, seismic data is recorded during the waiting period until the next shot point is reached. Although the shot spacings may be constant, the waiting periods typically vary within a range 0.1-0.2 seconds because of varying environment conditions. The duration of the waiting periods typically follow a narrow normal distribution represented by a bell-shaped curve 316 centered about an average waiting period denoted by $T_{ave}$ 318.

Figure 4:
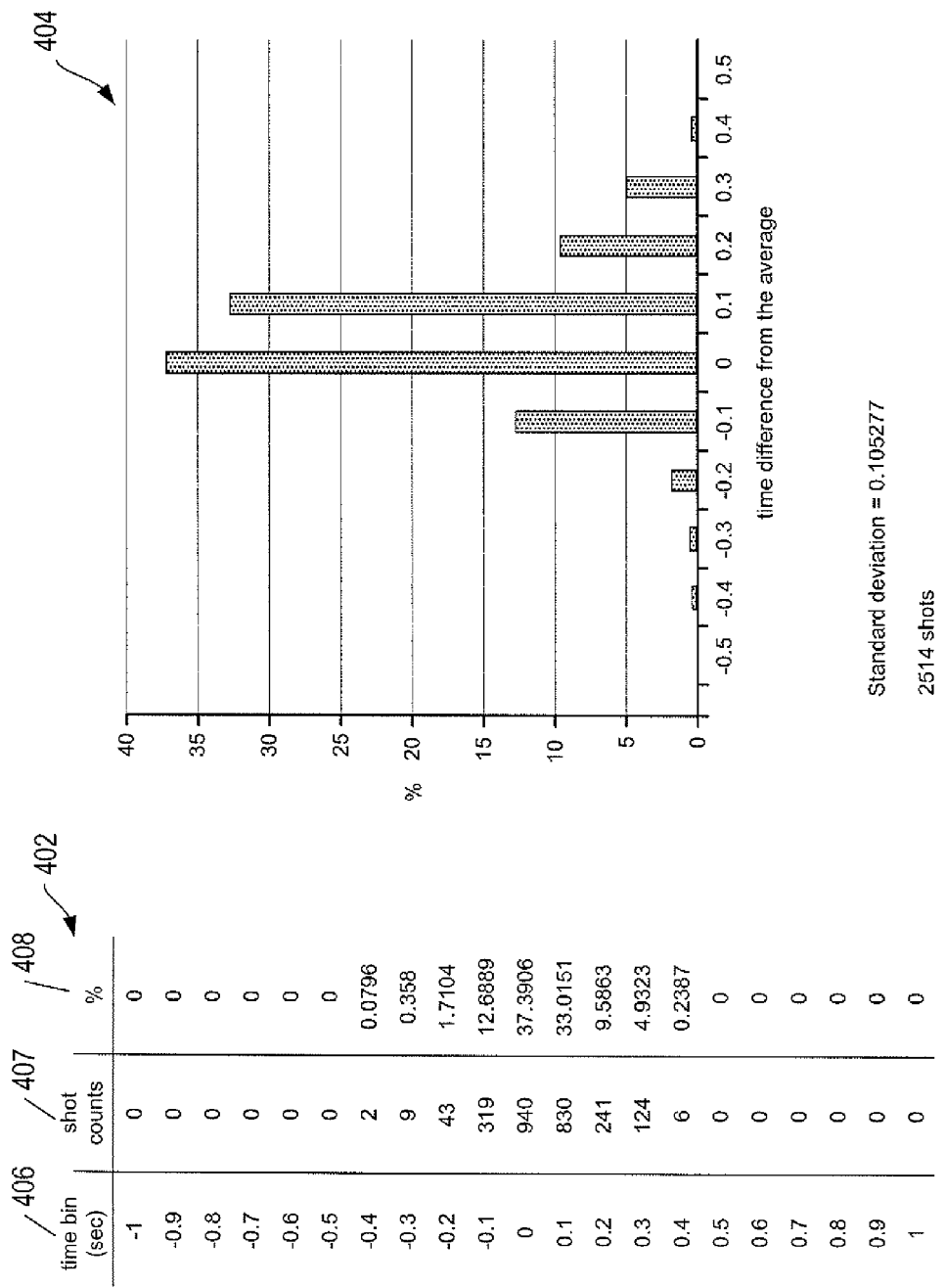
FIG. 4 shows a table and a histogram of a distribution of waiting periods for a typical marine survey.

FIG. 4 shows a table 402 and a histogram 404 of a typical distribution of waiting periods for an actual marine survey. A source was activated 2514 times at regular shot spacings. In other words, the source was fired on position, so the time intervals between shots varied depending on environmental conditions. After removing the low frequency trend, the standard deviation of the waiting periods is about 0.105 seconds. Table 402 has a time bin column 406, a column 407 that lists the number of shot counts for each time bin, and a column 408 that lists the percentage of shots for each time bin. The time bins are labeled in tenths of a second from the average waiting period. For example, time bin "0" represents the waiting periods within −0.05 to 0.05 seconds of the average waiting period, and time bin "0.1" represents the waiting periods within 0.05 to 0.15 seconds of the average waiting time period. Column 407 indicates that 940 waiting periods are in time bin "0," 319 waiting periods are in time bin "−0.1," and 830 waiting periods are in time bin "0.1." Histogram 404 indicates that the waiting periods follow a standard normal distribution with 37.4% of the waiting periods within about ±0.05 seconds of the average waiting period, and all 2514 shot-time intervals are within about ±0.4 seconds of the average waiting period. The data shown in column 408, and represented in the histogram 404, indicate that the when a source is activated on position alone the firing time is randomized according to a narrow normal distribution. The randomized firing times are within a narrow range of times between about ±0.4 seconds of the average waiting period, and more than 83% of the waiting periods are within a very narrow range of about ±0.1 seconds (i.e., within the first standard deviation 0.105 seconds).

Although the shot times may vary within a narrow range of about ±0.4 seconds, the time at which the shot is made is known precisely. As a result, primary seismic data can be aligned from shot to shot. However, the secondary wavefield energy returning from a subterranean formation does not stop at the end of a waiting period, but instead continues to emanate from the subterranean formation long after the waiting period has elapsed, although reflected acoustic energy gradually weakens over time because of the effects of spherical spreading. FIG. 5 shows a plot of acoustic energy versus time for three separate shots separated by 10 second waiting periods. Horizontal axis 502 represents time, and vertical axis 504 represents acoustic energy. Exponentially decaying dashed curves 506-508 represent the approximate dissipation of the acoustic energy over time associated with shots 1-3, respectively. Note that the acoustic energy associated with shot 1 is still present in the waiting period after shot 2 and the acoustic energy associated with shot 2 is still present in the waiting period of after shot 3. As a result, the seismic data recorded in the waiting period just after shot 2 will contain the primary data from shot 2 and the deeper secondary returning acoustic energy in the time range of 10-20 seconds after shot 1. Similarly, the seismic data recorded for 10 seconds after shot 3 will contain the primary data from shot 3, the 10-20 secondary acoustic energy returns associated with shot 2 and the 20-30 secondary acoustic energy returns of shot 1.

FIGS. 6A-6C show examples of shot-receiver gathers associated with shots 1-3 described above with reference to FIG. 5. Vertical axes 602 represent time with time zero corresponding to the when the source is fired, and horizontal axes 604 are source-receiver distance or offset. In FIGS. 6A-6C, diagonal lines 606-608 represent the primary wavefields associated with shots 1-3, respectively, travelling directly from the source to the receivers, starting at time zero when the distance from the source to the receiver is 0 m. Solid hyperbolic-shaped curves, such as curves 610-612, represent reflections or secondary wavefields from interfaces in a subterranean formation, which depend on the propagation velocities of the acoustic waves in the subterranean formation, and can occur at any time depending on the geology of the subterranean formation. For example, curves 610-612 represent reflections from the same interface within the subterranean formation produced by the primary wavefield generated by shots 1-3, respectively. The amplitude of the reflections generally decay with propagation time and distance due to spherical spreading, transmission loss, and anelastic absorption. FIGS. 6B and 6C represent reflections from interfaces within the subterranean formation associated with previous shots that are still present, but are much weaker due to the longer time since the source was fired. For example, although for shot 2 the survey vessel has moved a few meters, the gather in FIG. 6B includes dashed hyperbolic-shaped curves 614-617 that represent subterranean reflections associated with the acoustic energy generated by previous shot 1. In FIG. 6C, after shot 3, again similar subterranean reflections associated with the acoustic energy from previous shot 2 are represented by dotted hyperbolic-shaped curves 618-621. The reflections recorded in the gathers of FIGS. 6B and 6C may be slightly different due to variations in geology, but because the distance between shots is small (e.g., between approximately 18 to 50 m,), the differences between the reflections represented in the gathers of FIGS. 6B and 6C are small.

When the waiting period between shots is constant and the variations in subsurface formations is limited, recorded reflections occur at similar times in the shot record and the residual energy from previous shots represented by curves 614-621 in the gathers of FIGS. 6B and 6C occur at approximately the same times in nearly every shot record. Because it is assumed that each shot record only contains reflections originated from the same shot, the reflections from previous shots are referred to as "shot generated noise." Because shot generated noise occurs at approximately the same time in each shot record, the noise is coherent from shot to shot at lower frequencies. Unlike noise that is un-correlated from shot to shot, when data from multiple shots are summed, for example, in the imaging stage or stacking process, shot generated noise will not be attenuated. The attenuation of shot generated noise when summing data over multiple shots is frequency dependent. When the timing variation in the waiting period is small, as described above with reference to FIG. 5, the high frequencies (short wavelengths) are attenuated, but the lower frequencies have much longer wavelengths and will add constructively. For example, a 1 Hz wave completes a single cycle in 1 second. As a result, a waiting period variation of 0.1 second does not significantly attenuate this frequency.

Figure 7:
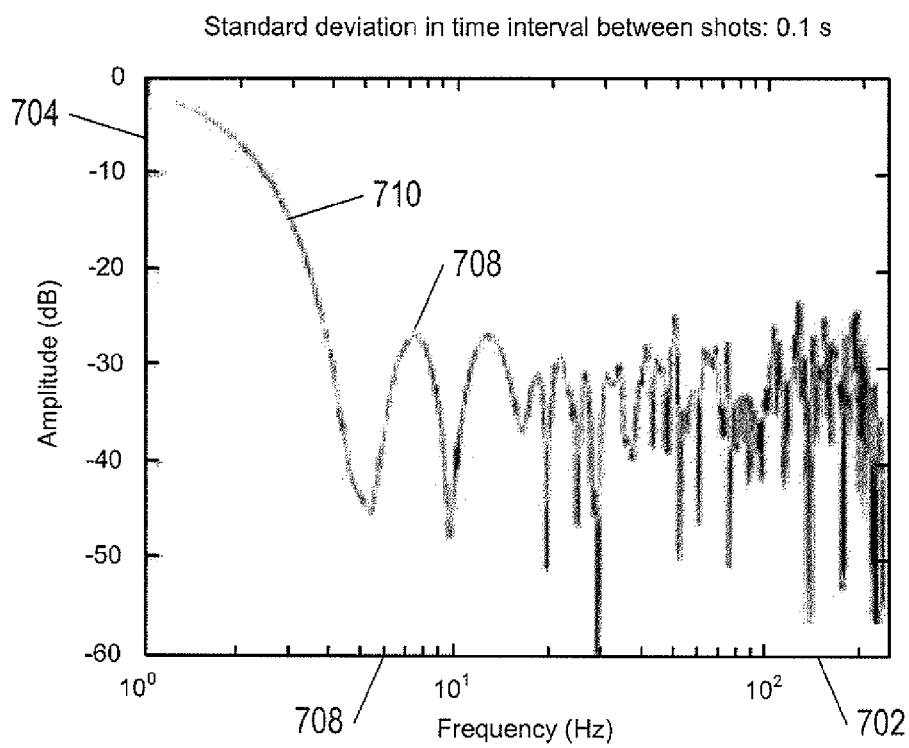
FIG. 7 shows a plot of source amplitude versus frequency for a source fired on position.

The implications of firing a source based on position alone are illustrated in FIG. 7. FIG. 7 shows a plot of source amplitude versus frequency with the source activated on position. Horizontal axis 702 is a logarithmic scale of frequencies ranging from 0 to about 200 Hz, vertical axis 704 represents the achieved amplitude attenuation of the shot generated noise in decibels. From the point 706 with increasing frequency, the attenuation is on the order of 30 to 40 decibels. However at the frequencies below point 706, the attenuation gradually decreases from around 40 decibels at around 5 Hz to close to 0 decibels at 1 Hz. The standard deviation in shot-time intervals is 0.1 seconds, which is similar to the standard deviation for the shot-time interval data represented in FIG. 5. Curve 706 indicates that for frequencies greater than about 6 Hz 708, the residual shot energy is attenuated. However, for frequencies below about 6 Hz 708, the recorded shot energy is not attenuated, as indicated by the smooth portion 710. In other words, the frequencies with much longer wavelengths are not attenuated by the natural fire time deviations in typical seismic operations.

Attenuation of Shot Generated Noise

Computational systems and methods for operating a source to attenuate shot generated noise are now described. These methods are not restricted to shot generated noise, but are also applicable to any form of noise that is coherent from shot to shot. In conventional seismic acquisition the source is activated based on position, typically every 25 m. This gives an approximate time interval between successive shots of about 10 seconds (i.e., typical vessel speed is around 2.5 m/s). Rather than activating the source based precisely on position, the systems and methods described below are directed to activating the source only approximately on position and within a firing time "randomization window" that has a duration greater than the typical variation found in conventional acquisition on the order of about 0.1 seconds. For example, for a nominal firing interval of 10 seconds and a 2 second randomization window, the source randomization window would be between approximately 9 and 11 seconds after the previous activation of the source.

Figure 8:
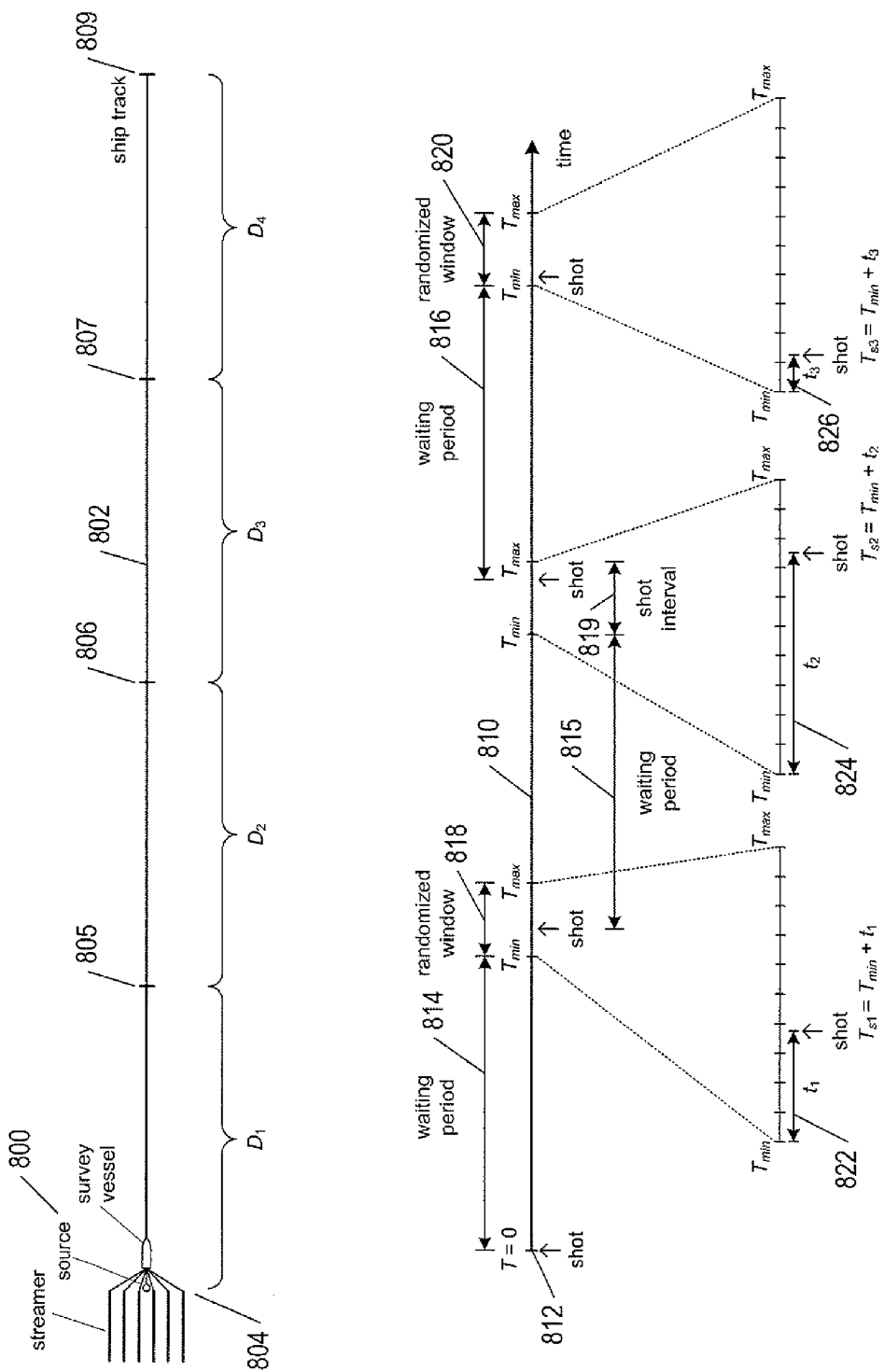
FIG. 8 shows a marine seismic data acquisition system traveling a survey vessel track.

FIG. 8 shows a marine seismic data acquisition system 800 composed of a survey vessel towing a source and six separate streamers. In this example, the survey vessel follows a straight survey vessel track 802. Marks 804-808 represents shot points along the vessel track 802 where the source is activated. The shot points are separated by shot spacings denoted by $D_1$, $D_2$, $D_3$ and $D_4$ and the shot spacings may be of different lengths, because the source is activated on time and not on position. In practice, the shot spacings may range from about 18 to about 50 meters. The source is composed of an array of source elements as described above. The survey vessel includes global positioning instruments that enable the survey vessel to determine its current location and the location of the shot points 804-808 and the exact time when the source was activated at shot points. In practice, the survey vessel is not limited to traveling a straight-line vessel track. Vessel tracks can be curved or circular or be any other suitable non-linear path.

FIG. 8 includes a time line 810 that represents an example of the passage of time associated with the shot points 804-807 identified along the vessel track 802. The survey begins when the source is activated at time zero 812 (i.e., T=0). The duration of a waiting period defines a minimum time delay, $T_{min}$, between shots. At the end of each waiting period, a randomization window begins, such as randomization windows 818-820. The duration of a waiting period plus the duration of a randomization window defines a maximum time delay, $T_{max}$, between shots. The duration of a randomization window is given by:

$$T_{win} = T_{max} - T_{min} \qquad (1)$$

The duration of the randomization window $T_{win}$ is on the order of about 0.1 or more seconds. The randomization window $T_{win}$ may, for example, have a duration of about 0.1 seconds, 0.5 seconds, 1 second, or 2 seconds, or may have any duration greater than about 0.1 seconds. The source is activated within the nth shot at a randomly selected time, $T_{sn}$, where n is the shot index, and $T_{min} \leq T_{sn} \leq T_{max}$. In other words, the source is activated when a waiting period and a random time delay $t_n$, that lies in the interval $0 \leq t_n \leq T_{win}$, have elapsed. The time delay $t_n$, is related to the randomly selected time $T_{sn}$ by:

$$T_{sn} = T_{min} + t_n \quad (2)$$

where $0 \leq t_n \leq T_{win}$.

In the example of FIG. 8, three randomization windows 818-820 are enlarged to reveal the durations of three time delays. After the shot at T=0, 812, the waiting period 814 begins and is allowed to elapse before the randomization window 818 begins. The source is activated in the randomization window 818 at a randomly selected time $T_{s1}$ between $T_{min}$ and $T_{max}$. In other words, when the waiting period 814 ends, the source is activated at the end of a randomly selected time delay $t_1$ 822. When the source is activated at time $T_{s1}$, the next waiting period 815 begins. When the waiting period 815 ends, the source is activated in the randomization window 819 at a randomly selected time $T_{s2}$ between $T_{min}$ and $T_{max}$. In other words, when the waiting period 815 ends, the source is activated with a randomly selected time delay $t_2$ 824. When the source is activated at time $T_{s2}$, the next waiting period 816 begins and the source is activated in the randomization window 820 at a randomly selected time $T_{s3}$ between $T_{min}$ and $T_{max}$. In other words, when the waiting period 816 ends, the source is activated with a randomly selected time delay $t_3$ 826. The time and position of each shot is recorded, and after each shot, seismic data is recorded during the subsequent waiting period and randomly selected time delay before the next shot. For example, when the source is activated at time t=0, 812, seismic data is recorded during the waiting period 814 and the time delay 822.

Figure 9:
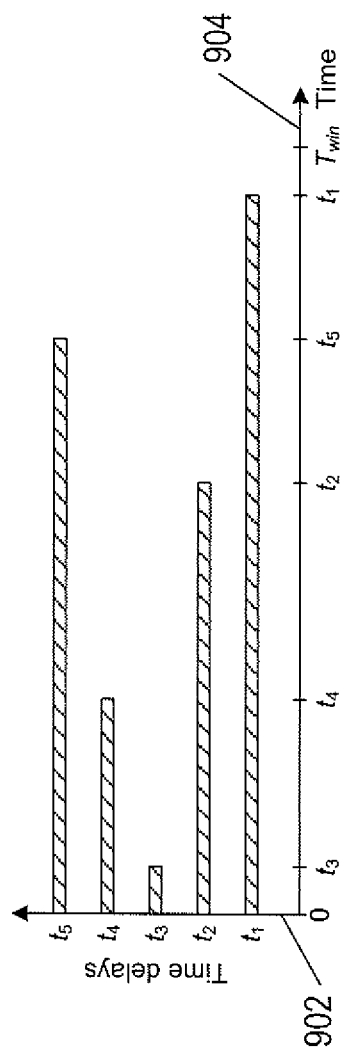
FIG. 9 shows a histogram for a set of five example randomized time delays.

In other embodiments, rather than randomly selecting a time delay for each randomization window of a marine survey, a set of random time delays can be generated prior to the marine survey and used repeatedly throughout the survey to pseudo randomly activate the source. FIG. 9 shows a histogram of a set of five example random time delays $t_1$, $t_2$, $t_3$, $t_4$, and $t_5$. Vertical axis 902 identifies the five time delays, and horizontal axis 904 represents an example of a randomization window with a duration of $T_{win}$. The duration of each time delay corresponds to the length of a bar, which is less than $T_{win}$, and is marked along the time axis 904. Time delay $t_3$ is the shortest time delay in the set, and time delay $t_1$ is the longest time delay in the set. The set of time delays may be used to attenuate shot generated noise by randomly selecting one of the time delays from the set for each randomization window of a marine survey with the restriction that no one time delay is used for at least two consecutive activations of the source. For example, consider consecutive first and second activations of a source. For the first activation, a first time delay is selected from the set. The source is activated when a waiting period and the first time delay have elapsed. For the second activation, a second time delay that is different from the first time delay is selected from the set. The source is activated when the waiting period and the second time delay have elapsed.

In other embodiments, a random sequence of time delays used for a first vessel track of a marine survey can be stored and repeated for subsequent vessel tracks of the same marine survey. In still other embodiments, a random sequence of time delays used for a first vessel track of a marine survey can be stored and randomly reshuffled for each subsequent vessel track of the same marine survey.

Random time delays can be generated using a random number generator. For example, when the survey time is within a randomization window, a random number can be generated by a random number generator, and the random number is scaled to fit within the duration of the randomization window and is added to $T_{min}$. The random number generator can be a pseudo-random number generator based on an algorithm, a physical random number generator based on a truly random physical process such as thermal noise, or a probability density function. For example, if the random number generator generates a random number, r, between zero and one (i.e., $0 \leq r \leq 1$), then the time delay is given by: $t_n = rT_{win}$.

When a source is activated with time delays that are varied in a random, pseudo-random or systematic manner from shot to shot, the arrival time of the shot generated noise relative to the arrival time of the reflections will vary from shot to shot. As a result, when summing data from multiple shot records after having corrected for the known activate time delays, the seismic data of interest adds constructively but the shot generated noise may add destructively. In other words, the shot generated noise is attenuated relative to the seismic data of interest and this attenuation will extend to lower and lower frequencies when increasing the variation in the time interval between shots. For example, in migration or stacking seismic data of interest adds constructively but shot generated noise is attenuated.

Figure 10:
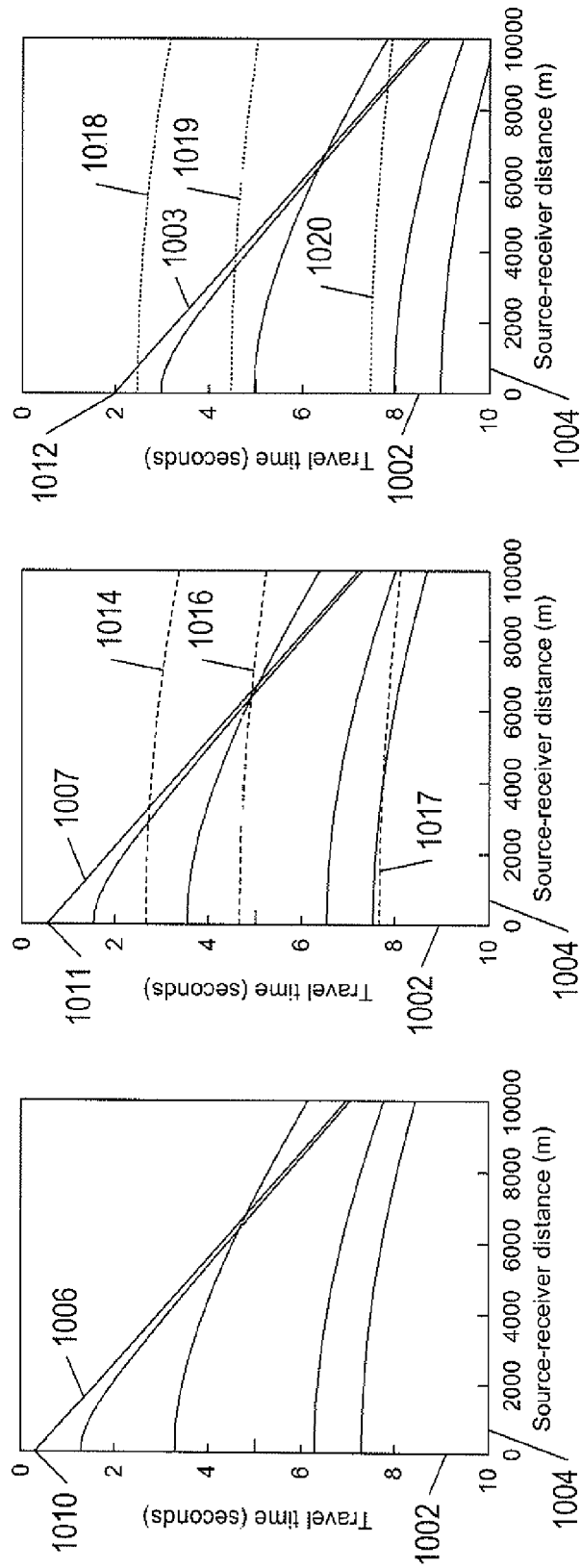
FIGS. 10A-10C show examples of shot-receiver gathers associated with a source fired with three different randomized time delays.

FIGS. 10A-10C show examples of shot-receiver gathers associated with a source activated with three different randomized time delays. Vertical axes 1002 represent time with time zero corresponding to the beginning of a randomization window, and horizontal axes 1004 are source-receiver distance or offset. In FIGS. 10A-10C, diagonal lines 1006-1008 represent the primary wavefields associated with three shots 1, 2 and 3, respectively, travelling directly from the source to the receivers. In FIG. 10A, shot 1 is activated at time 1010. In FIG. 10B, shot 2 is activated at a later time 1011. And in FIG. 10C, shot 3 is activated at time 1012. Solid hyperbolic-shaped curves represent reflections or secondary wavefields emanating from a subterranean formation as a result of the shot associated with the gather. FIGS. 10B and 10C include reflections from interfaces within the subterranean formation associated with previous shots, but are much weaker than the reflection from the same interface associated with the current shot. For example, in FIG. 10B, dashed hyperbolic-shaped curves 1014-1017 represent subterranean reflections associated with acoustic energy generated by previous shot 1. In FIG. 10C, dotted hyperbolic-shaped curves 1018-1020 represent subterranean reflections associated with acoustic energy generated by previous shot 2. Even though the distance between shots is small (e.g., between approximately 18 to 50 m,) the differences between the secondary reflections 1014-1017 and the secondary reflections 1018-1020 are large. As a result, when the seismic data in the gathers in FIGS. 10B and 10C are aligned in time and stacked, the secondary reflections 1014-1017 add destructively to the secondary reflections 1018-1020.

Figure 11:
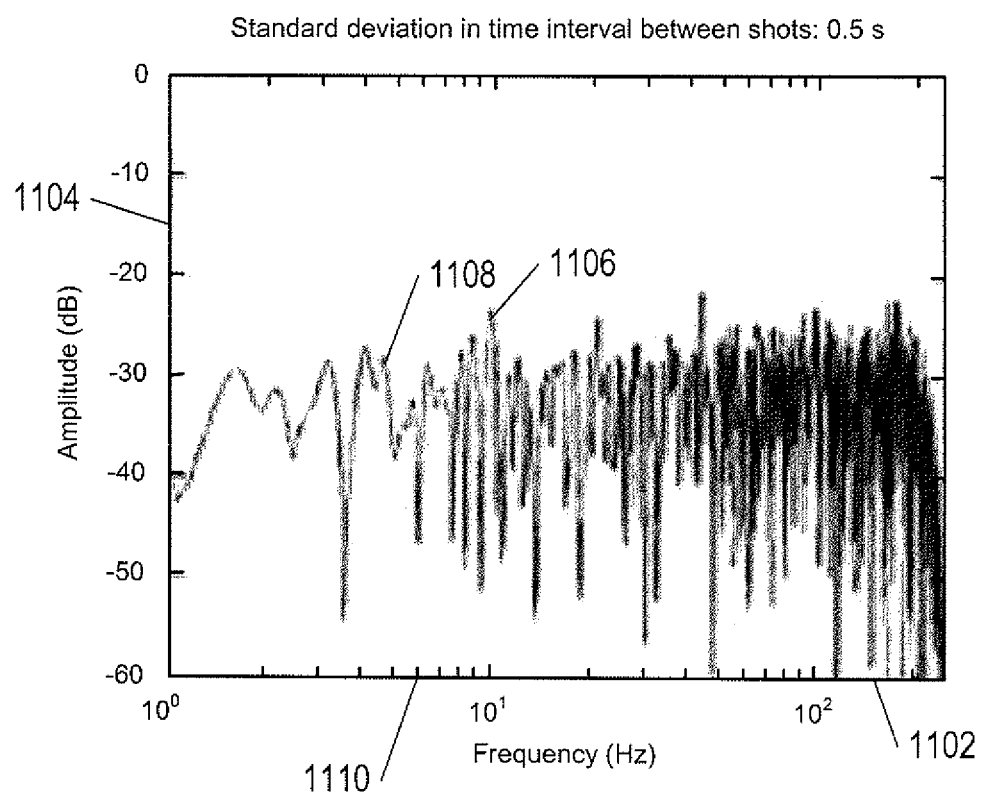
FIG. 11 shows a plot of source amplitude versus frequency for a source fired with randomized time delays.

FIG. 11 shows a plot of amplitude attenuation of shot generated noise versus frequency for a source randomly activated with a 0.5 second standard deviation in the waiting periods. Horizontal axis 1102 is a logarithmic scale of frequencies ranging from 0 to about 200 Hz, vertical axis 1104 represents amplitude in decibels, and curve 1106 represents residual shot energy for 1000 shots. Notice that the portion 1108 of the curve 1106 is attenuated for frequencies below about 6 Hz 1110, in contrast to the curve shown in FIG. 7. In other words, by randomly firing the source as described above, the acoustic energy associated with the full range of frequencies, including low frequencies, is attenuated.

Figure 12:
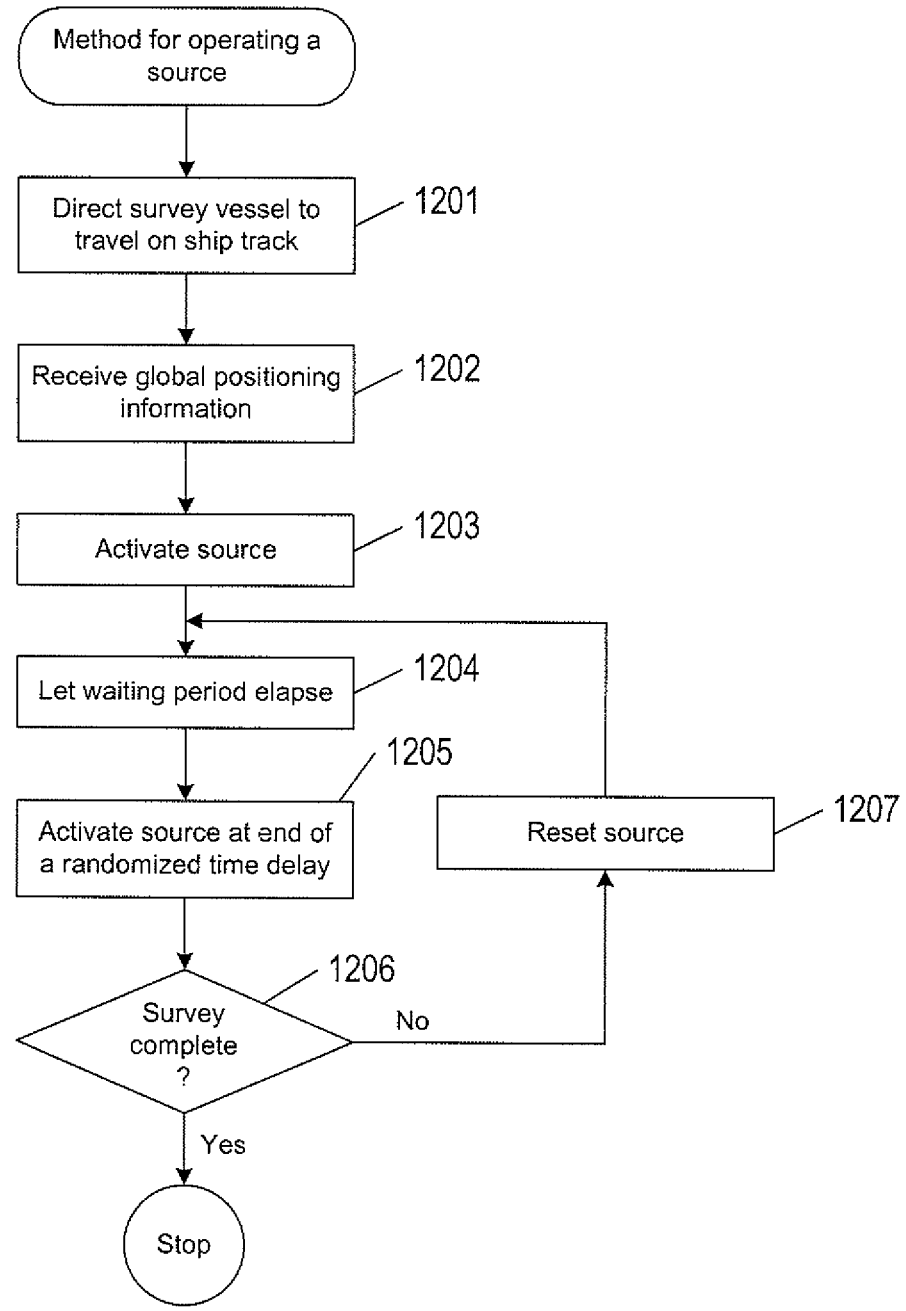
FIG. 12 shows a control-flow diagram of a method for operating a source to attenuate shot generated noise.

FIG. 12 shows a control-flow diagram of a method for operating a source in a seismic marine survey. In block 1201, a survey vessel tows a source along a vessel track. The source can be composed of a number of source elements as described above with reference to FIG. 2. The vessel track can be linear or curved depending on the type of survey. In block 1202, global positioning information that describes the exact location of the survey vessel along the vessel track is received. In block 1203, at the beginning of the survey, the source is activated and the position of the survey vessel is recorded and the time is recorded. In block 1204, a waiting period is allowed to elapse, as described above with reference to FIGS. 8 and 10. In block 1205, the source is activated at the end of a randomized time delay. The time delays can be generated at random for each randomization window as described above with reference to FIG. 8, or the time delays can be generated in a pseudo-random manner as described above with reference to FIGS. 9-10. In block 1206, when the survey is complete, operation of the source stops; otherwise, control flows to block 1207. In block 1207, the source is reset and the operations in block 1204-1206 are repeated.

Figure 13:
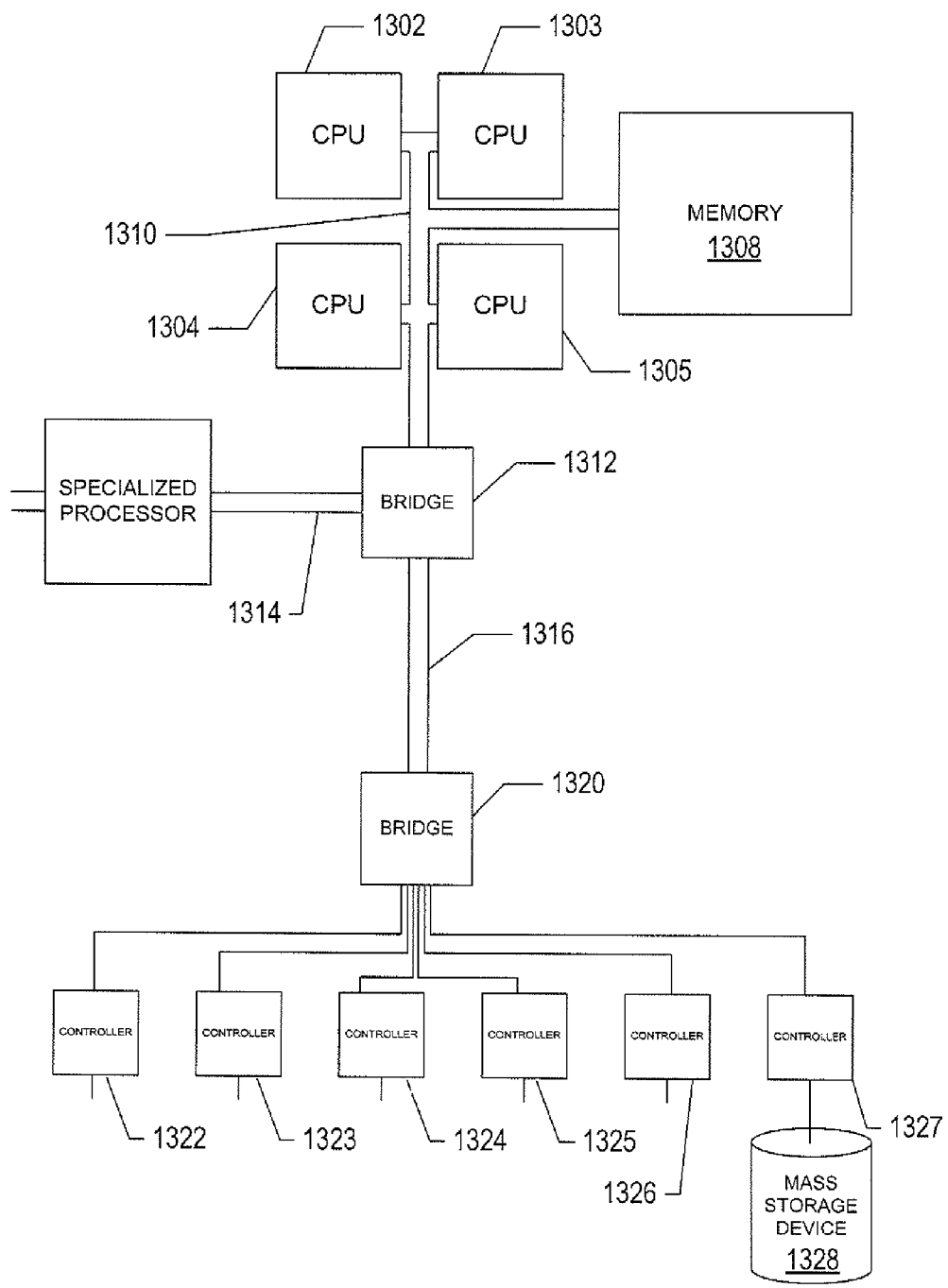
FIG. 13 shows an example of a generalized computer system that executes an efficient method for operating a source to attenuate shot generated noise.

FIG. 13 shows an example of a generalized computer system that executes an efficient method for operating a source to attenuate shot generated noise. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 1302-1305, one or more electronic memories 1308 interconnected with the CPUs by a CPU/memory-subsystem bus 1320 or multiple busses, a first bridge 1312 that interconnects the CPU/memory-subsystem bus 1310 with additional busses 1314 and 1316, or other types of high-speed interconnection media, including multiple, high-speed serial interconnects. The busses or serial interconnections, in turn, connect the CPUs and memory with specialized processors, such as a graphics processor 1318, and with one or more additional bridges 1320, which are interconnected with high-speed serial links or with multiple controllers 1322-1327, such as controller 1327, that provide access to various different types of computer-readable media, such as computer-readable medium 1328, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1328 is a non-transitory data-storage device, including electronic memory, optical or magnetic disk drive, USB drive, flash memory and other such data-storage device. The computer-readable medium 1328 can be used to store machine-readable instructions that encode the computational methods described above and can be used to store encoded data, during store operations, and from which encoded data can be retrieved, during read operations, by computer systems, data-storage systems, and peripheral devices.

Various embodiments described herein are not intended to be exhaustive of or to limit this disclosure to the precise forms described. Modifications within the spirit of the invention will be apparent to those skilled in the art. For example, any number of different computational-processing-method implementations that carry out the methods for randomizing firing times of simultaneous source may be designed and developed using various different programming languages and computer platforms and by varying different implementation parameters, including control structures, variables, data structures, modular organization, and other such parameters. The systems and methods for randomizing firing times of a source can be executed in near-real time while conducting a marine survey of a subterranean formation. The term "near-real time" refers to a time delay due to data transmission and data processing that is short enough to allow timely use of the time delays computed during a seismic data acquisition survey. For example, near-real time can refer to a situation in which generating the time delays and transmitting corresponding firing signals to the simultaneous source is insignificant. In other embodiments, the time delays for each randomization window and waiting periods of a seismic data acquisition survey can be calculated in advance and stored in a computer-readable medium. In still other embodiments, randomized activate time delays can be used to activate different source elements of a single source from shot to shot can reduce the shot to shot coherency.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for operating a seismic source towed by a survey vessel, the method comprising:
    activating the source more than once, wherein each activation of the source following a previous activation of the source includes,
        randomly selecting a time delay in a randomization window;
        allowing a waiting period to elapse;
        allowing the time delay to elapse after the waiting period; and
        activating the source when the waiting period and the time delay have elapsed.

2. The method of claim 1, wherein the source comprises a plurality of source elements.

3. The method of claim 1, wherein the source comprises at least one air gun.

4. The method of claim 1, wherein randomly selecting the time delay in the randomization window further comprises:
    generating a random number using a random number generator; and
    calculating the time delay as the random number scaled to lie within the duration of the randomization window.

5. The method of claim 1, wherein the randomization window is a window of time equal to a maximum time delay minus a minimum time delay equal to the waiting period.

6. The method of claim 5, wherein the maximum time delay is the waiting period plus the randomization window and the minimum time delay is the waiting period.

7. The method of claim 1, wherein the waiting period is substantially constant for each activation of the source.

8. The method of claim 1, wherein the waiting period begins when the source is activated for a previous activation of the source and the time delay begins when the waiting period has elapsed.

9. The method of claim 1 further comprising after activation of the source, recording seismic data during the waiting period and the time delay in one or more data storage devices.

10. The method of claim 1, wherein randomly selecting the time delay further comprises pseudo randomly selecting the time delay.

11. The method of claim 1, wherein the randomization window has a duration of about 0.1 or more seconds.

12. A marine seismic data acquisition system comprising:
a seismic source; and
a computer system for operating the seismic source comprising:
one or more processors;
one or more data-storage devices; and
a routine stored in one or more of the one or more data-storage devices and executed by the one or more processors, the routine directed to activating the source more than once, wherein for each activation of the source following a previous activation of the source includes,
randomly selecting a time delay in a randomization window;
allowing a waiting period to elapse;
allowing the time delay to elapse after the waiting period; and
activating the source when the waiting period and the time delay have elapsed.

13. The system of claim 12, wherein the source comprises a plurality of source elements.

14. The system of claim 12, wherein the source comprises at least one air gun.

15. The system of claim 12, wherein randomly selecting the time delay in the randomization window further comprises:
generating a random number using a random number generator; and
calculating the time delay as the random number scaled to lie within the duration of the randomization window.

16. The system of claim 12, wherein the randomization window is a window of time equal to a maximum time delay minus a minimum time delay equal to the waiting period.

17. The system of claim 16, wherein the maximum time delay is the waiting period plus the randomization window and the minimum time delay is the waiting period.

18. The system of claim 12, wherein the waiting period is constant for each activation of the source.

19. The system of claim 12, wherein the waiting period begins when the source is activated for a previous activation of the source and the time delay begins when the waiting period has elapsed.

20. The system of claim 12 further comprising after activation of the source, recording seismic data during the waiting period and the time delay in the one or more data storage devices.

21. The system of claim 12, wherein randomly selecting the time delay further comprises pseudo randomly selecting the time delay.

22. The system of claim 12, wherein the randomization window has a duration of about 0.1 or more seconds.

23. A non-transitory computer-readable medium having machine-readable instructions encoded thereon for enabling one or more processors of a computer system to perform the operations of:
randomly generating a set of time delays, each time delay is within a randomization window; and
activating a source more than once, wherein each activation of the source following a previous activation of the source comprises
selecting a time delay from the set of time delays;
allowing a waiting period to elapse;
allowing the time delay to elapse after the waiting period; and
activating the source at the end of the selected time delay.

24. The medium of claim 23, wherein randomly generating the set of time delays further comprises:
generating a random number using a random number generator; and
calculating a time delay in the set as the random number scaled to lie within the duration of the randomization window.

25. The medium of claim 23, wherein selecting the time delay from the set of time delays further comprises randomly selecting the time delay from the set of time delays.

26. The medium of claim 23, further comprises:
ordering the set of time delays into a sequence; and
for each activation of the source,
selecting each time delay in order from the sequence.

27. The medium of claim 23, wherein the randomization window is a window of time equal to a maximum time delay minus a minimum time delay equal to the waiting period.

28. The medium of claim 27, wherein the maximum time delay is the waiting period plus the randomization window length and the minimum time delay is the waiting period.

29. The medium of claim 23, wherein the waiting period is constant for each activation of the source.

30. The medium of claim 23, wherein the waiting period begins when the source is activated for a previous activation of the source and the time delay begins when the waiting period has elapsed.

31. The medium of claim 23 further comprising after activation of the source, recording seismic data during the waiting period and the time delay in one or more data storage devices.

32. The medium of claim 23, wherein randomly selecting the time delay further comprises pseudo randomly selecting the time delay.

33. The medium of claim 23, wherein the randomization window has a duration of about 0.1 or more seconds.

34. A computer system for operating a seismic source comprising:
one or more processors;
one or more data-storage devices; and
a routine stored in one or more of the one or more data-storage devices and executed by the one or more processors, the routine directed to activating the source more than once, wherein for each activation of the source following a previous activation of the source includes,
randomly selecting a time delay in a randomization window;
allowing a waiting period to elapse;
allowing the time delay to elapse after the waiting period and
activating the source when the waiting period and the time delay have elapsed.

35. The system of claim 34, wherein randomly selecting the time delay in the randomization window further comprises:

generating a random number using a random number generator; and calculating the time delay as the random number scaled to lie within the duration of the randomization window.

36. The system of claim 34, wherein the randomization window is a window of time equal to a maximum time delay minus a minimum time delay equal to the waiting period.

37. The system of claim 36, wherein the maximum time delay is the waiting period plus the randomization window and the minimum time delay is the waiting period.

38. The system of claim 34, wherein the waiting period is constant for each activation of the source.

39. The system of claim 34, wherein the waiting period begins when the source is activated for a previous activation of the source and the time delay begins when the waiting period has elapsed.

40. The system of claim 34 further comprising after activation of the source, recording seismic data during the waiting period and the time delay in the one or more data storage devices.

41. The system of claim 34, wherein randomly selecting the time delay further comprises pseudo randomly selecting the time delay.

42. The system of claim 34, wherein the randomization window has a duration of about 0.1 or more seconds.

* * * * *